United States Patent [19]

Pringle

[11] 4,065,153
[45] Dec. 27, 1977

[54] VEHICLE WHEEL SUSPENSION ASSEMBLY

[75] Inventor: William L. Pringle, Grosse Pointe Shores, Mich.

[73] Assignee: United States Steel Corporation, Pittsburgh, Pa.

[21] Appl. No.: 715,886

[22] Filed: Aug. 19, 1976

[51] Int. Cl.² ............................................. B60G 11/12
[52] U.S. Cl. ..................... 280/704; 267/18; 267/31; 280/718
[58] Field of Search ............... 280/704, 718, 697, 715; 267/31, 32, 41, 18

[56] References Cited

U.S. PATENT DOCUMENTS

| 1,066,313 | 7/1913 | Parrott | 267/31 |
|---|---|---|---|
| 1,448,904 | 5/1923 | Sprague | 267/18 |
| 1,984,565 | 12/1934 | Bell | 280/697 |
| 2,453,388 | 11/1948 | Schramm | 280/718 |
| 2,896,939 | 7/1959 | Woodhead | 280/715 |
| 3,083,034 | 3/1963 | Hollowell | 280/718 |
| 3,165,332 | 1/1965 | Barker | 280/715 |
| 3,170,712 | 2/1965 | Hildebrandt | 280/715 |
| 3,831,210 | 8/1974 | Ow | 280/704 |
| 3,960,389 | 6/1976 | Narahari | 267/32 |
| 3,970,293 | 7/1976 | Sweet | 267/31 |

FOREIGN PATENT DOCUMENTS 35,972  5/1950  Poland .............................. 280/697

Primary Examiner—Joseph F. Peters, Jr.
Assistant Examiner—John A. Carroll
Attorney, Agent, or Firm—McGlynn and Milton

[57] ABSTRACT

A vehicle wheel suspension assembly capable of moving a vehicle wheel between a surface-engaging position and a retracted position wherein the assembly comprises a support structure, a connecting bracket for attaching the support structure to the undercarriage of the vehicle, an arm for rotatably supporting a vehicle wheel, the arm being pivotally connected to the support structure to permit reciprocal movement of the arm in a generally vertical plane, a resilient member supported by the support structure, and a combined connecting and lifting device connecting the arm to the resilient member; the device being movable between a first mode in which the vehicle wheel is in a surface-engaging position and the arm is rigidly connected to the resilient member and a second mode in which the vehicle wheel is in a retracted position, the device including a control mechanism for selectively moving the device between the first and second modes.

15 Claims, 4 Drawing Figures

VEHICLE WHEEL SUSPENSION ASSEMBLY

FIELD OF THE INVENTION

This invention relates to a vehicle wheel suspension assembly for mounting a set of wheels to a vehicle, such as a trailer, which is capable of moving the set of wheels between a surface engaging position and a retracted, or raised, position.

PRIOR ART

Many vehicle wheel suspension assemblies have employed the expedient of rotatably mounting a vehicle wheel on an arm which is in turn pivotally connected to a support structure to permit reciprocal movement of the arm and, consequently, the wheel in a vertical plane. The suspension function is carried out by a suitable resilient member, such as a leaf spring assembly, a shock absorber, or some other energy absorbing device, which is connected between the arm and the support structure so that reciprocal motion of the arm is resisted by the resilient member. This type of wheel suspension assembly is commonly used with large multi-axle trailers encountered in the trucking industry. An example of this type of wheel suspension is shown in U.S. Pat. No. 2,226,100, issued Dec. 24, 1940. Additionally, means have been incorporated in such an assembly for moving the vehicle wheel between a surface engaging position and a retracted, or raised, position. When the trailer is not loaded, or only slightly loaded, it may not be necessary for the trailer to be supported by all the available sets of wheels. Since the wheels, and more precisely, the tires which are mounted on the wheels, are quite expensive, it is desirable to lift the wheels out of the surface engaging position when not needed to reduce wear. An example of this type of wheel suspension assembly which includes a lift feature is shown in U.S. Pat. No. 3,523,697, issued Aug. 11, 1970. Heretofore, such vehicle wheel suspension assemblies have been of relatively complicated design. Particular design problems have been encountered in integrating the suspension function with the lifting function of the entire assembly.

SUMMARY OF THE INVENTION

This invention provides a vehicle wheel suspension assembly capable of moving a vehicle wheel between a surface engaging position and a retracted position which is of a new and relatively simple design. More specifically, the vehicle wheel assembly includes a support structure which is attachable to the undercarriage of a vehicle by means of a hanger bracket device. The assembly includes an arm which is pivotally connected to the support structure to permit reciprocal movement of the arm in a generally vertical plane. One or more vehicle wheels are supported by the arm so that the wheel, or wheels, can move up and down in a vertical plane. Resilient means, such as a leaf spring assembly, is supported by the support structure and is connected to the arm by combined connecting and lifting means. The combined connecting and lifting means is movable between a first mode in which the vehicle wheel(s) is in a surface engaging position so as to aid in the support of the vehicle and a second mode in which the vehicle wheel(s) is in a retracted, or lifted, position. In other words, in the first mode, the combined connecting and lifting means forms a connection between the arm and the resilient means so that reciprocal motion of the arm is resisted by the resilient means, thus providing a spring suspension for the wheel(s). When moved toward the second mode, the combined connecting and lifting means lifts the wheel to a position above the surface normally engaged by the wheel. The combined connecting and lifting means also includes control means for selectively moving the combined connecting and lifting means between the first and second modes.

Other advantages of the present invention will be readily appreciated as the same becomes better understood by reference to the following detailed description when considered in connection with the accompanying drawings.

DESCRIPTION OF THE INVENTION

Figure 1:
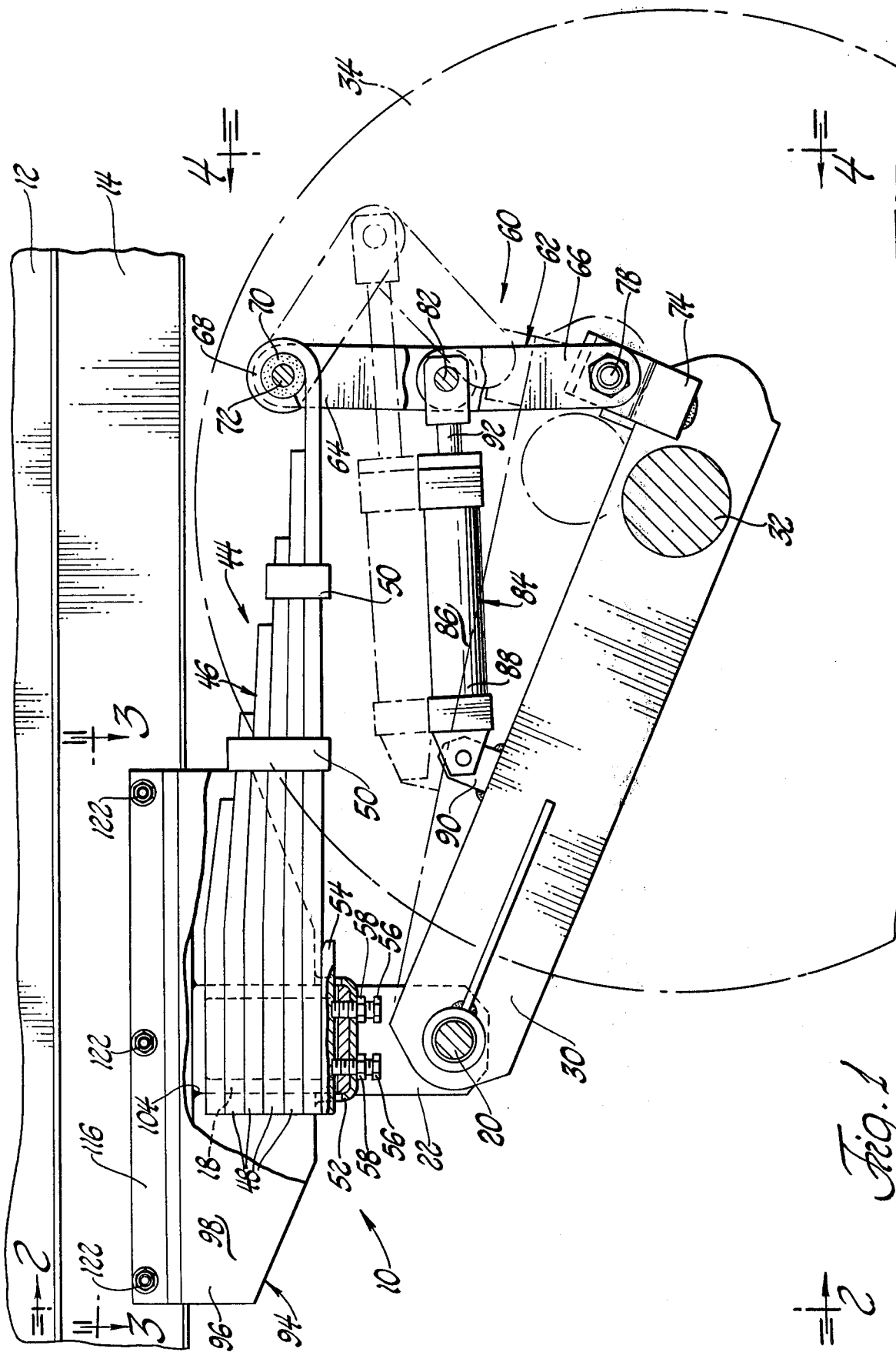
FIG. 1 is a side-elevational view of a vehicle wheel suspension assembly constructed in accordance with the instant invention.
Figure 2:
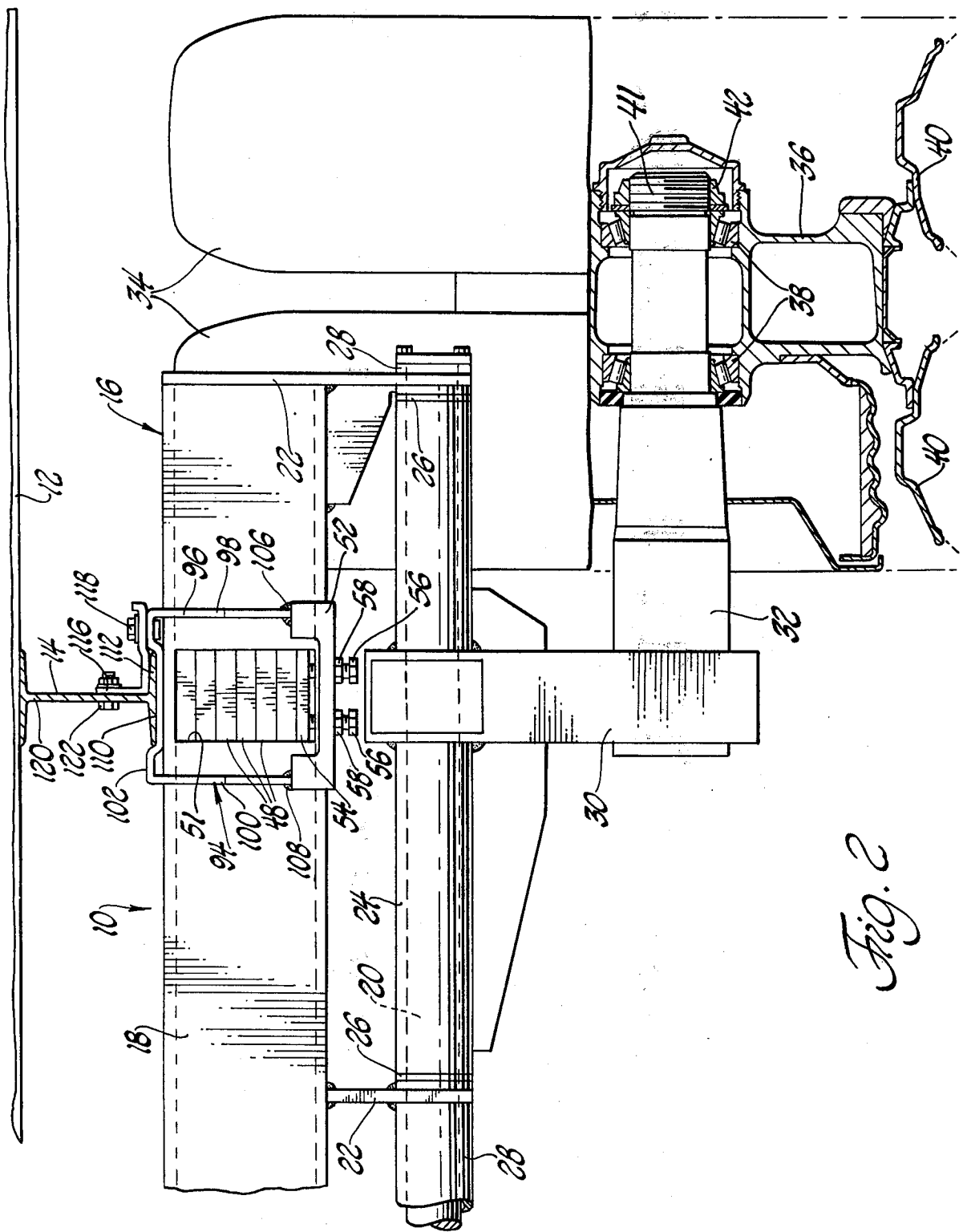
FIG. 2 is a front-elevational view taken generally along line 2—2 of FIG. 1.
Figure 3:
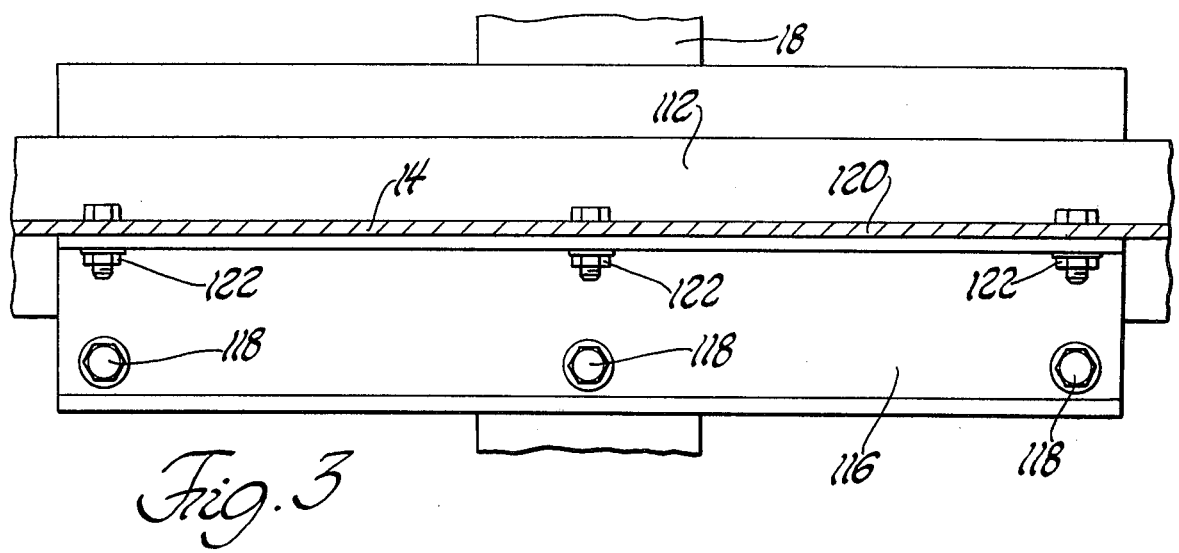
FIG. 3 is a cross-sectional view taken generally along line 3—3 of FIG. 1.

Referring more particularly to the drawings, FIGS. 1 and 2 illustrate one side of a vehicle wheel suspension assembly, generally shown at 10, which is constructed in accordance with the instant invention. The vehicle wheel assembly 10 is attached to the underside, or undercarriage, 12 of a vehicle, such as a multi-axle truck trailer. As is conventional, the underside of the trailer 12 includes an I-beam 14 to which the vehicle wheel suspension assembly is directly connected. The opposite side of the vehicle wheel suspension assembly 10 is not shown since it is substantially identical to that shown in FIG. 1. Suffice it to say, however, that the vehicle wheel suspension assembly extends between the sides of the trailer 12 and includes substantially identical elements (except for the differences necessitated by the right and left-hand arrangement) for supporting one or more wheels on both sides of the trailer 12.

The vehicle wheel suspension assembly 10 includes a support structure generally indicated at 16. The support structure 16 includes a box-type cross beam 18 which extends across the width of the trailer 12. A support shaft 20 is supported by plates 22 which are welded to and depend from the cross beam 18. A cylindrically-shaped sleeve 24 is rotatably supported on the support shaft 20. In order to insure free rotational movement of the sleeve 24, suitable sleeve bearings (not shown) are provided between the rotatable sleeve 24 and the support shaft 20. Nylon spacers 26, or the like, separate the rotatable sleeve 24 from nonrotatable sleeve portions 28 which are supported by the plates 22.

A pivot arm 30 is securely attached, as by welding, to the rotatable sleeve 24 so that the arm 30 is capable of reciprocal movement in a generally vertical plane. The arm 30 carries a spindle 32, or axle, of suitable design on which is mounted a pair of tires 34. More specifically, a drum 36 is rotatably mounted on the end of the spindle 32 by means of a set of wheel bearings 38. The end of the spindle 32 is suitably threaded, as at 41, for receiving a locknut 42 which holds the bearings 38 and drum 36 on the spindle 32. Standard truck wheels 40 are mounted on the drum 36. The wheels 40 are adapted to receive suitable rubber tires 34.

In order to provide a spring suspension for the trailer 12, the tires 34 are permitted to move up and down in a generally vertical plane in response to road conditions. Such movement is resiliently resisted by a resilient member, such as a leaf spring assembly, or the like. In the assembly thus far described, reciprocal movement of the tires 34 results in pivotal movement of the arm 30 about the support shaft 20. The spring suspension function is provided by resilient means 44 which resiliently resists, or dampens, the pivotal movement of the arm 30. In other words, the resilient means 44 supports the trailer 12 over the arm 30 and flexes resiliently in response to up and down movement of the tires 34. The resilient means 44 is entirely supported by and reacts against the support structure 16 for a reason which will be explained herein. The resilient means 44 preferably comprises a leaf spring assembly, generally indicated at 46, which includes a plurality of leafs 48 held together by straps 50. While a leaf spring assembly is employed as the resilient means 44 it is contemplated that other types of energy absorbers may be used, such as a coil spring, without departing from the spirit of the invention.

In order to mount the leaf spring assembly 46, openings 51 are provided in the sidewalls of the cross beam 18. Hence, the leaf spring assembly can be mounted transversely with respect to the beam 18. An upturned, generally U-shaped, saddle-like bracket 52 which, as will be described more clearly herein, forms part of a hanger bracket assembly, supports a movable plate 54 which is moved against the lowermost leaf of the leaf spring assembly 46 by means of bolts 56. In other words, the bolts 56 are received in threaded holes formed in the bridge portion of the U-shaped bracket 52. The ends of the bolts 56 are received in blind bores formed in the underside of the plate 54. When the bolts 56 are turned in or out, the plate 54 moves up or down. When the bolts 56 are fully tightened, the plate 54 holds the leaf spring assembly 46 tightly against the upper sides of the openings 51 in the cross beam 18. When tightened, the bolts 56 are locked in place by lock nuts 58 to prevent inadvertent loosening of the leaf spring assembly 46 during operation. It should be apparent, from the foregoing description, that the leaf spring assembly 46 can easily be replaced by loosening the bolts 56 to drop plate 54 and thereby release the leaf spring assembly 46.

In order to dampen the reciprocal motion of the arm 30 by the leaf spring assembly 46, these two elements must be connected in such a manner that movement of the arm 30 is transmitted to the leaf spring assembly 46. Any motion of the arm 30 will, therefore, be resisted by the leaf spring assembly 46. This function is accomplished by combined connecting and lifting means generally shown at 60 which connects the arm 30 to the leaf spring assembly 46. The combined connecting and lifting means 60 is movable between a first mode (shown in solid lines) in which the vehicle tire 34 is in a surface-engaging position and a second mode (shown in broken lines) in which the vehicle wheel 34 is in a retracted, or lifted, position. In other words, when the vehicle wheel 34 is in the ground-engaging position, reciprocal movement of the arm 30 is dampened by the leaf spring assembly 46. When the combined connecting and lifting means 60 is moved to the second mode, the vehicle wheel 34 is lifted out of engagement with the surface into a retracted position. In this manner, the combined connecting and lifting means 60 serves both functions of transmitting motion of the arm 30 to the leaf spring assembly 46 and, when desired, of lifting the vehicle wheel 34 to a retracted position.

In the specific embodiment of the assembly shown, the combined connecting and lifting means 60 includes a collapsible link generally indicated at 62 which is connected between the arm 30 and a leaf spring assembly 46. When the combined connecting and lifting means 60 is in the first mode, the collapsible link 62 maintains a fixed distance of separation between the points of connection on the arm 30 and the leaf spring assembly 46. When the combined connecting and lifting means 60 is moved to the second mode, the collapsible link 62 is forcefully collapsed thus causing a reduction in the distance of separation between the points of connection on the arm 30 and the leaf spring assembly 46. A force is thereby produced which moves, or lifts, the arm 30 toward the leaf spring assembly 46. In other words, the collapsible link 62 has a fully-extended position in the first mode in which the vehicle wheel 34 is in a surface-engaging position and a collapsed position in which the vehicle wheel 34 is in a retracted position.

Figure 4:
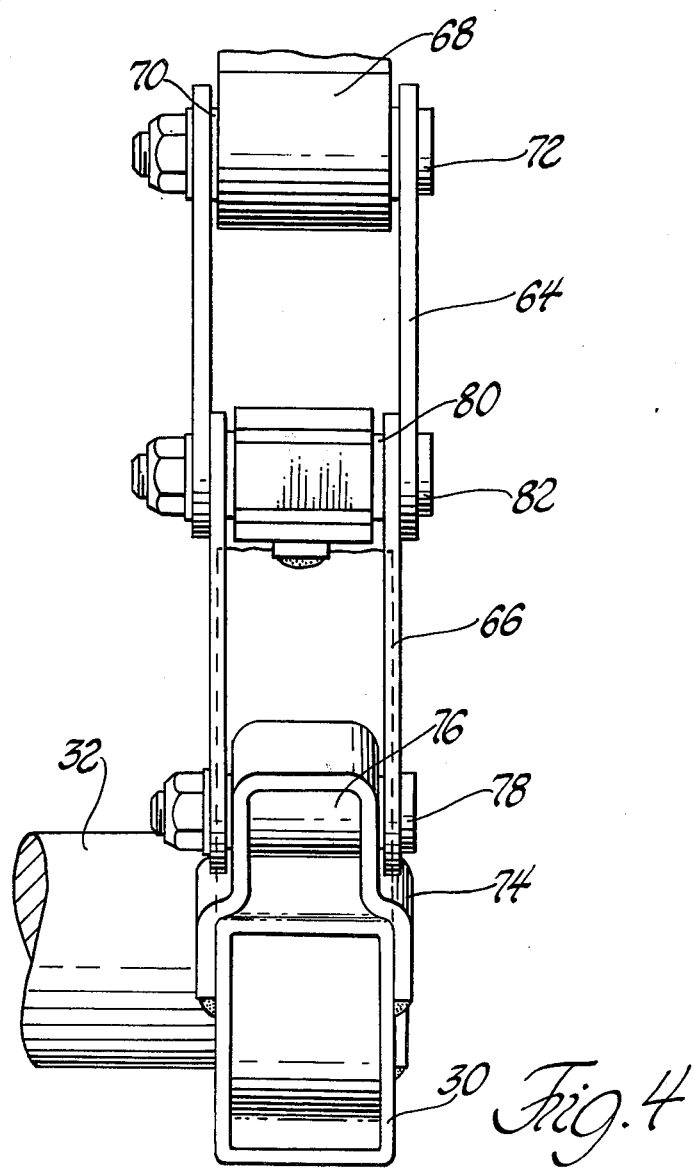
FIG. 4 is a view taken generally along line 4—4 of FIG. 1.

Preferably, the collapsible link 62 comprises a toggle-link device having first and second link members 64 and 66 respectively. The first link member 64 is pivotally connected to the leaf spring assembly 46. This can be conveniently accomplished by wrapping the end 68 of the lowermost leaf 48 of the leaf spring assembly 46 around a bushing 70. The assembly is held together by means of a bolt and nut assembly 72 in which the bolt extends through the bushing 70. This arrangement is best shown in FIG. 4. To provide sufficient strength, the link 64 is made up of two plates, one being disposed on each side of the bushing 70. The second link member 66 is pivotally connected to a bracket 74 which is in turn welded to the arm 30. The second link member also includes a pair of plates which are held apart by a bushing 76, the assembly being held together by a bolt and nut assembly 78. The free ends of the first and second link members 64 and 66 are pivotally connected by means of a bushing 80 and a bolt and nut assembly 82 to form a toggle joint between the arm 30 and the leaf spring assembly 46.

The combined connecting and lifting means 60 includes control means, generally indicated at 84, for selectively moving the collapsible link 62 between the extended position (shown in solid lines) and the collapsed position (shown in broken lines). The control means 84 comprises an hydraulic cylinder and piston device 86 wherein the cylinder portion 88 is pivotally connected to the arm 30 by means of a bracket 90 while the piston rod 92 is connected to the toggle joint between the two link members 64 and 66. Suitable hydraulic lines (not shown) are connected to the hydraulic cylinder 88 which conduct hydraulic fluid under pressure to the hydraulic cylinder 88. Suitable manual controls (not shown) are also provided for controlling the flow of hydraulic fluid to and from the hydraulic cylinder 88. As shown in FIG. 1, when the piston rod 92 is moved outwardly (to the right), the collapsible link 62 is forced to collapse in a scissors-like fashion and the elements move to the broken-line position. Since the leaf spring assembly 46 is held substantially stationary, an upwardly directed force is produced which pivots the arm 30 about the shaft 20. Consequently, the vehicle wheel 34 is lifted from a surface-engaging position to a retracted position. Reversing this operation lowers the vehicle wheel 34 back into surface-engaging position and also straightens the first and second link members 64 and 66 so that motion is transmitted to the leaf spring assembly 46 in order to resist reciprocal movement of the arm 30.

It is noted that the control means 84, in this case the hydraulic piston device 86, is wholly supported by the assembly 10. This permits the assembly to be self-contained. In other words, it is not necessary for any of the elements of the assembly to react against any portion of the vehicle frame to accomplish the lifting function. As will be more clearly described herein, this feature, in combination with a uniquely designed hanger bracket, allows the vehicle wheel suspension assembly 10 to be quickly and easily mounted to or demounted from the vehicle.

More specifically, the assembly 10 includes hanger bracket means, generally indicated at 94, for releasably securing the support structure 16 to the I-beam 14 of the vehicle. The hanger bracket means 94 includes an elongated member 96 having an inverted U-shaped cross section. In other words, as best shown in FIG. 2, the member 96 includes a pair of parallel plates 98 and 100 which are connected at their upper ends by a connecting plate 102. Aligned rectangular slots 104 are provided in the plates 98 and 100 for receiving the cross beam 18. The cross beam 18 is held in place by welding the saddle-like, U-shaped bracket 52 to the lower edges of the plates 98 and 100 as shown at 106 and 108, for example.

The connecting plate 102 of the elongated member 96 includes a recessed channel 110 which is adapted to receive the lower plate 112 of the I-beam 14. The elongated member 96 is securely fastened to the I-beam 14 by clamping the lower plate 112 of the I-beam 14 in the channel 110. This is accomplished by means of an L-shaped bracket 116 which is bolted to the connecting wall 102 of the elongated member 96 by a plurality of bolts 118 and is also bolted to the web 120 of the I-beam 14 by means of a plurality of bolts 122. In this manner, a releasable clamp is provided for removably attaching the support structure 16 to the undercarriage of a vehicle. Consequently, since the vehicle wheel suspension assembly 10 is self-contained, due to its unique design, the entire suspension assembly 10 can be removed from the vehicle by releasing the clamp bracket 116. At most the only other connection with the vehicle is the hydraulic lines for the hydraulic cylinder and piston device 86. This design offers the advantage of being able to quickly and easily mount the vehicle wheel suspension assembly 10 at any point along the undercarriage of the vehicle since special mounting structure is not required on the vehicle itself.

In summary, the vehicle wheel suspension assembly is unique in that the suspension and lifting functions are combined into essentially a single mechanism. This design permits a relatively simple and uncomplicated suspension assembly to be produced. Additionally, all elements of the assembly can be ultimately supported by the support structure. Hence, by providing the support structure with a hanger bracket having a releasable clamp, the entire suspension assembly package can be quickly and easily attached to the undercarriage of a vehicle.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that the invention may be practiced otherwise than as specifically described herein and yet remain within the scope of the appended claims.

The embodiments of the invention in which an exclusive property or privilege is claimed are defined as follows:

1. A vehicle wheel suspension assembly capable of moving a vehicle wheel between a surface-engaging position and a retracted position, said assembly comprising: a support structure, bracket means for attaching said support structure to a vehicle, an arm for rotatably supporting a vehicle wheel, said arm being pivotally connected to said support structure to permit reciprocal movement of said arm in a generally vertical plane, resilient means supported by said support structure, and combined connecting and lifting means connecting the free end of said arm to said resilient means; said connecting and lifting means being movable between a first mode in which the vehicle wheel is in a surface-engaging position and a second mode in which said vehicle wheel is in a retracted position, said connecting and lifting means including a collapsible link connected between the free end of said arm and said resilient means which maintains a fixed distance of separation between the points of connection when said connecting and lifting means is in said first mode and causes a reduction in the distance of separation upon collapse when said connecting and lifting means is moved toward said second mode to move said arm toward resilient means and control means operatively connected to said collapsible link for selectively moving said connecting and lifting means between said first and second modes.

2. An assembly as set forth in claim 1 wherein said collapsible link includes a toggle link device having first and second link members, one link member being pivotally connected to said arm and the other to said resilient means and said link members being pivotally connected together to form a toggle joint.

3. An assembly as set forth in claim 2 wherein said control means includes an actuator connected between said arm and said toggle joint for moving said link members between an extended and a collapsed position.

4. An assembly as set forth in claim 3 wherein said actuator includes an hydraulically-actuated piston and cylinder device.

5. An assembly as set forth in claim 4 wherein said support means includes hanger bracket means including a releasable clamp for removably attaching said support structure to a vehicle.

6. An assembly as set forth in claim 5 wherein said hanger bracket means includes removable fasteners for securing said support structure to a vehicle.

7. An assembly as set forth in claim 6 wherein said support structure includes a rotatable sleeve and a support shaft supporting said sleeve, said arm being connected to said sleeve for pivotal movement about said support shaft.

8. An assembly as set forth in claim 7 wherein said resilient means includes a leaf spring assembly.

9. A self-contained, demountable vehicle wheel suspension assembly capable of moving a vehicle wheel between a surface-engaging position and a retracted position, said assembly comprising: a support structure, hanger bracket means including a releasable clamp for removably attaching said support structure to a vehicle, an arm for rotatably supporting a vehicle wheel, said arm being pivotally connected to said support structure to permit reciprocal movement of said arm in a generally vertical plane, resilient means supported by said support structure, and combined connecting and lifting means connecting the free end of said arm to said resilient means; said connecting and lifting means being movable between a first mode in which the vehicle wheel is in a surface-engaging position and a second mode in which the vehicle wheel is in a retracted position, said connecting and lifting means including a collapsible link connected between said arm and said resilient means which maintains a fixed distance of separation between the points of connection when said connecting and lifting means is in said first mode and causes a reduction in the distance of separation upon collapse when said connecting and lifting means is in said second mode to move said arm toward said resilient means to thereby move the vehicle wheel to a retracted position and control means wholly supported by said assembly and operatively connected to said collapsible link for selectively moving said means between said first and second modes.

10. An assembly as set forth in claim 9 wherein said collapsible link includes a toggle link device having first and second link members, one link member being pivotally connected to said arm and the other to said resilient means and said first and second link members being pivotally connected together to form a toggle joint.

11. An assembly as set forth in claim 10 wherein said control means includes an actuator connected between said arm and said toggle joint for moving said link members between an extended and a collapsed position.

12. An assembly as set forth in claim 11 wherein said actuator includes an hydraulically-actuated piston and cylinder device.

13. An assembly as set forth in claim 12 wherein said releasable clamp includes removable fasteners for securing said support structure to a vehicle.

14. An assembly as set forth in claim 13 wherein said support structure includes a rotatable sleeve and a support shaft supporting said sleeve, said arm being connected to said sleeve for pivotal movement about said support shaft.

15. An assembly as set forth in claim 14 wherein said resilient means includes a leaf spring assembly.

* * * * *